(12) United States Patent
Kurata et al.

(10) Patent No.: US 10,140,983 B2
(45) Date of Patent: Nov. 27, 2018

(54) BUILDING OF N-GRAM LANGUAGE MODEL FOR AUTOMATIC SPEECH RECOGNITION (ASR)

(71) Applicant: INTERNATIONAL BUSINESS MACHINES CORPORATION, Armonk, NY (US)

(72) Inventors: Gakuto Kurata, Tokyo (JP); Toru Nagano, Tokyo (JP); Masayuki Suzuki, Tokyo (JP); Ryuki Tachibana, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 14/838,643

(22) Filed: Aug. 28, 2015

(65) Prior Publication Data

US 2017/0061960 A1 Mar. 2, 2017

(51) Int. Cl.
*G10L 15/197* (2013.01)
*G10L 15/06* (2013.01)
(Continued)

(52) U.S. Cl.
CPC .......... *G10L 15/197* (2013.01); *G06F 17/277* (2013.01); *G10L 2015/088* (2013.01)

(58) Field of Classification Search
CPC .............. G10L 15/197; G10L 2015/088; G06F 17/277
(Continued)

(56) References Cited

U.S. PATENT DOCUMENTS

| 6,418,431 B1 * | 7/2002 | Mahajan | G06F 17/30687 |
| 7,254,529 B2 * | 8/2007 | Gao | G06F 17/2715 704/10 |

(Continued)

FOREIGN PATENT DOCUMENTS

| JP | 2009271465 A | 11/2009 |
| JP | 2010197411 A | 9/2010 |

OTHER PUBLICATIONS

Azzopardi, Leif, Mark Girolami, and Keith van Risjbergen. "Investigating the relationship between language model perplexity and IR precision-recall measures." Proceedings of the 26th annual international ACM SIGIR conference on Research and development in informaion retrieval. ACM, 2003.*

(Continued)

*Primary Examiner* — Edwin S Leland, III
(74) *Attorney, Agent, or Firm* — Tutunjian & Bitetto, P.C.; Vazken Alexanian (57) ABSTRACT

A method, a system, and a computer program product for building an n-gram language model for an automatic speech recognition. The method includes reading training text data and additional text data both for the n-gram language model from a storage, and building the n-gram language model by a smoothing algorithm having discount parameters for n-gram counts. The additional text data includes plural sentences having at least one target keyword. Each discount parameter for each target keyword is tuned using development data which are different from the additional text data so that a predetermined balance between precision and recall is achieved.

20 Claims, 3 Drawing Sheets

(51) Int. Cl.
*G06F 17/27* (2006.01)
*G10L 15/08* (2006.01)

(58) Field of Classification Search
USPC .......................................................... 704/243
See application file for complete search history.

(56) References Cited

U.S. PATENT DOCUMENTS

| | | | |
|---|---|---|---|
| 7,848,927 B2 | 12/2010 | Ohno et al. | |
| 8,447,608 B1* | 5/2013 | Chang | G10L 15/197 704/257 |
| 8,543,376 B2* | 9/2013 | Hwang | G06F 17/2818 704/2 |
| 9,367,526 B1* | 6/2016 | Vozila | G06Q 10/107 |
| 2008/0046244 A1* | 2/2008 | Ohno | G10L 15/30 704/255 |
| 2008/0162118 A1* | 7/2008 | Itoh | G06F 17/2735 704/10 |
| 2011/0224971 A1* | 9/2011 | Moore | G06F 17/271 704/9 |
| 2011/0224983 A1* | 9/2011 | Moore | G06F 17/2715 704/240 |
| 2012/0191745 A1* | 7/2012 | Velipasaoglu | G06F 17/3064 707/767 |
| 2012/0233128 A1* | 9/2012 | Solmer | G06K 9/00442 707/661 |
| 2014/0149429 A1* | 5/2014 | Gao | G06F 17/30702 707/749 |
| 2014/0207457 A1* | 7/2014 | Biatov | G10L 15/063 704/243 |
| 2014/0214421 A1* | 7/2014 | Shriberg | G10L 25/51 704/243 |
| 2015/0046452 A1* | 2/2015 | Agrawal | G06F 17/30241 707/737 |
| 2015/0081297 A1* | 3/2015 | Hakkani-Tur | G10L 15/065 704/243 |
| 2016/0063094 A1* | 3/2016 | Udupa | G06F 17/277 707/748 |
| 2016/0086599 A1* | 3/2016 | Kurata | G10L 15/063 704/243 |
| 2016/0162456 A1* | 6/2016 | Munro | G06F 17/30011 704/9 |
| 2017/0024663 A1* | 1/2017 | Liu | G06N 99/005 |
| 2017/0061960 A1* | 3/2017 | Kurata | G10L 15/197 |
| 2017/0206889 A1* | 7/2017 | Lev-Tov | G10L 15/01 |

OTHER PUBLICATIONS

Chen, S.F., et al., "An Empirical Study of Smoothing Techniques for Language Modeling," Harvard University, Aug. 1998. (pp. 1-63).
Korner, M.C., Implementation of Modified Kneser-Ney Smoothing on Top of Generalized Language Models for Next Word Prediction, Bachelorarbeit, Universtät Koblenz Landau, Sep. 2013. (pp. 1-49).
Mamou, J., et al., "Vocabulary Independent Spoken Term Detection," Proceedings of the 30th annual international ACM SIGIR conference on Research and development in information retrieval, Jul. 2007, (pp. 1-8).

* cited by examiner

BUILDING OF N-GRAM LANGUAGE MODEL FOR AUTOMATIC SPEECH RECOGNITION (ASR)

BACKGROUND

Technical Field

This invention relates to an n-gram language model and, more specifically, to a building of an n-gram language model for automatic speech recognition (ASR) system.

Background Art

In recent years, spoken data is rapidly increasing. The spoken data is generated in a variety of applications, such as call monitoring, market intelligence gathering, customer analytics, and on-line media search.

Spoken term detection is a key information retrieval technology which aims to conduct an open vocabulary search over large collections of the spoken data.

Call monitoring using the spoken term detection can be performed for all calls. In a call monitoring operation at a call center, for example, a specific word or an inappropriate statement is reviewed from a large number of speech calls to improve the quality of the call center, to ensure compliance, or to evaluate communicators (e.g., customer service representatives, telephone sales representatives, etc.).

In general, the spoken term detection is accomplished by converting speech data to text data using an automatic speech recognition (hereinafter also referred to as "ASR") system and searching for the text data.

Some customers of the call monitoring set a high value on precision and others set it on recall, according to a customer's demand or business operation.

Basically, the precision and the recall are in a trade-off relationship. Therefore, when one of either the precision and the recall is increased, the other tends to decrease.

Therefore, either of the precision or recall for keywords will be improved according to a customer's demand or business operation.

Many methods are known for calculating confidence scores for words after the ASR and the selected words whose score is higher than a threshold, such as in Jonathan Mamou, et. al., "Vocabulary independent spoken term detection", In Proc. of ACM SIGIR, 2007 available at http://researchweb.watson.ibm.com/haifa/projects/imt/sir/papers/sigir07.pdf). These methods can improve the precision of the spoken term detection.

SUMMARY

According to one aspect of the present invention, an embodiment of the present invention provides a computer-implemented method for building an n-gram language model for automatic speech recognition. The method includes reading training text data and additional text data both for the n-gram language model from storage, and building the n-gram language model by a smoothing algorithm having discount parameters for n-gram counts. The additional text data includes plural sentences having at least one target keyword. Each discount parameter for each target keyword is tuned using development data which are different from the additional text data so that a predetermined balance between precision and recall is achieved.

According to another aspect of the present invention, a system, such as a computer system, including a computer readable storage medium storing a program of instructions executable by the system to perform one or more methods described herein may be provided.

According to another aspect of the present invention, a computer program product including a computer readable storage medium storing a program of instructions executable by the system to perform one or more methods described herein also may be provided.

These and other features and advantages will become apparent from the following detailed description of illustrative embodiments thereof, which is to be read in connection with the accompanying drawings.

DETAILED DESCRIPTION OF THE EMBODIMENTS

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms used herein are not intended to be limited to any particular narrow interpretation unless clearly stated otherwise in the specification.

The terms used herein are first explained below, but not limited to such explanation.

The term "n-gram language model" is also referred to as an n-gram model. An n-gram is a contiguous sequence of n-items, such as words or characters from a sequence of text or speech data. The n-gram language model is a type of probabilistic language model for predicting a next item in the sequence of text or speech data. The n-gram language model may be used in automatic speech recognition (ASR).

The term "automatic speech recognition" is the translation of spoken words into text. In order to perform the automatic speech recognition, the ASR system includes "training" in which speech, such as spontaneous speech, and a transcription of the speech are used as training data. The training of the ASR includes a method for determining a parameter of the ASR system by using the training data as an input.

The term "precision" is a scale for determining whether only accurately recognized results are detected. The precision is calculated, for example, by a ratio of retrieval results satisfying the retrieval request to all documents satisfying the retrieval request.

The term "recall" is a scale for determining how thoroughly the detection is performed, although over detection caused by a speech recognition error is permitted. The recall is calculated, for example, by a ratio of retrieval results satisfying the retrieval request to all retrieval results.

Figure 1:
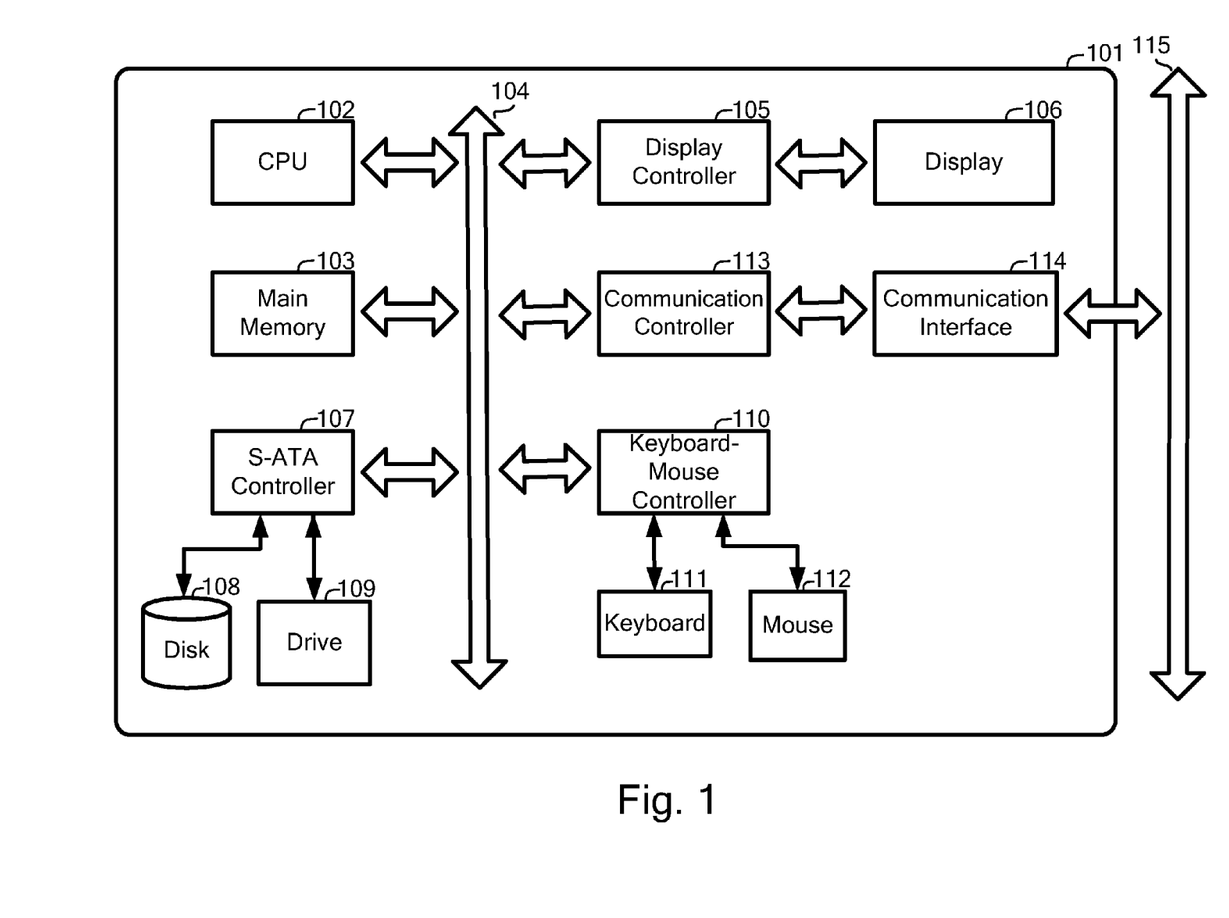
FIG. 1 illustrates an example of a block diagram of a computer hardware used in an embodiment of the present invention.

With reference now to FIG. 1, FIG. 1 illustrates an example of a block diagram of a computer hardware used in an embodiment of the present invention.

A computer (101) may be, for example, but is not limited to, a desktop, a laptop, a notebook, a tablet, a smartphone, a mobile phone or a server computer. The server computer may be, for example, but is not limited to, a workstation, a rack-mount type server, a blade type server, or a mainframe server and may run, for example, a hypervisor for creating and running one or more virtual machines. The computer (101) comprises one or more computer processing units (CPUs) (102) and a main memory (103) connected to a bus (104). The CPU (102) is preferably based on a 32-bit or 64-bit architecture. The CPU (102) is, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106), such as a liquid crystal display (LCD), may be connected to the bus (104) via a display controller (105). The display (106) may be used to display, for management of the computer(s), information on a computer connected to a network via a communication line and information on software running on the computer using an appropriate graphics interface. A disk (108), such as a hard disk or a solid state drive (SSD), and a drive (109), such as a CD, a DVD, or a BD (Blu-ray disk) drive, may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (102) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2:
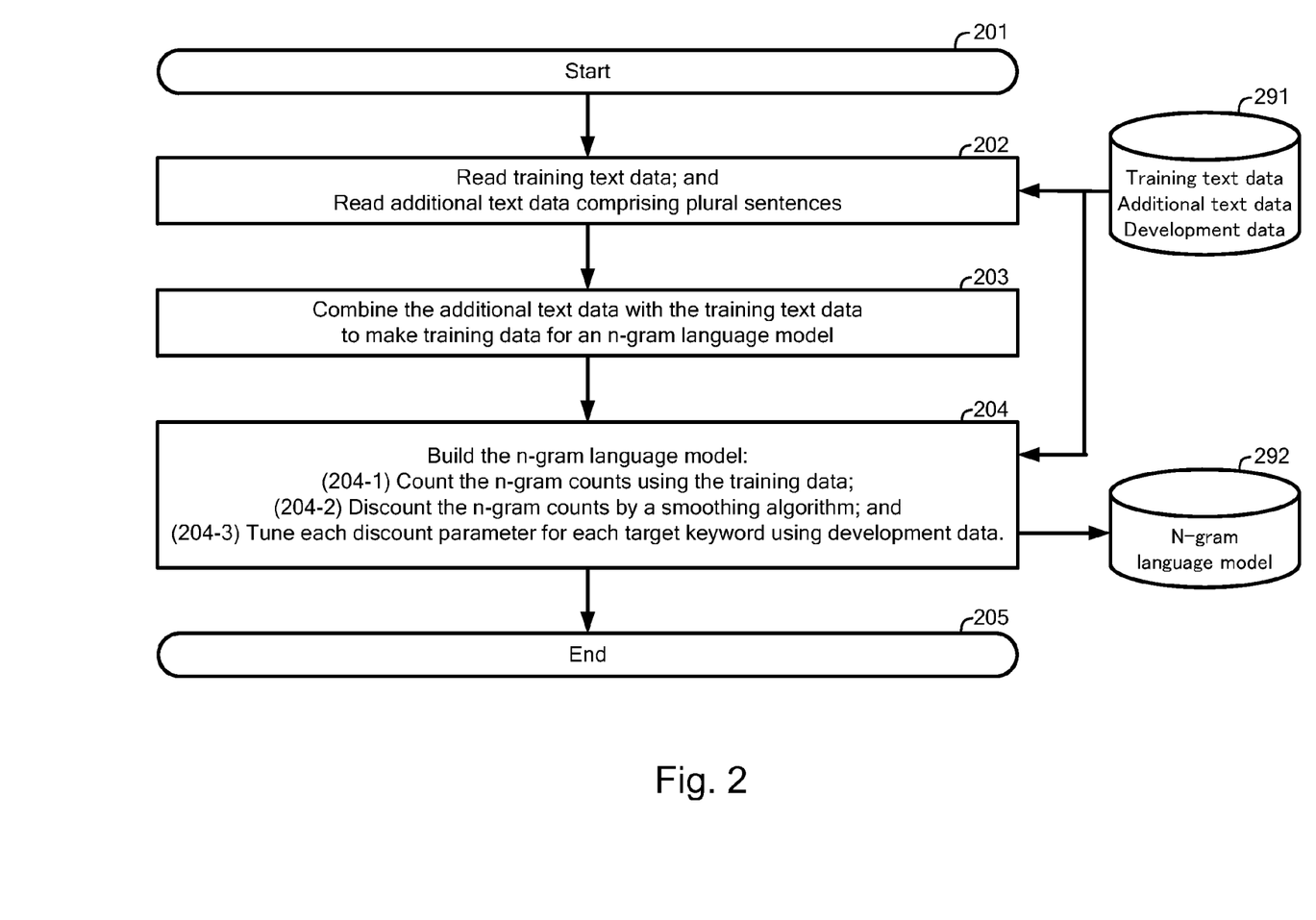
FIG. 2 illustrates one embodiment of a flowchart of a method for building an n-gram language model for an automatic speech recognition, in accordance with the present principles.

With reference now to FIG. 2, FIG. 2 illustrates one embodiment of a flowchart of a method for building an n-gram language model for an automatic speech recognition.

A system, such as the computer (101) of FIG. 1, may perform the method described in FIG. 2. The system may be implemented as a single computer or a plurality of computers.

In block 201, the system starts the method for building an n-gram language model for the ASR.

In block 202, the system may read training text data for building the n-gram language model. The training text data refers to text data for training the ASR system.

The training text data may be prepared by a variety of methods, such as methods known to a person having ordinary skill in the art.

The training text data are used to build the n-gram language model for the ASR, according to methods known to a person having ordinary skill in the art.

The system may read the training text data from storage (291), the storage (291) being accessible by the system. The storage (291) may include an internal storage (108) or external storage of the system or another storage accessible from the system via a network, such as a network attached storage (NAS).

In another embodiment, the system may read the training text data provided by an utterance, the utterance being used as input to the system. The utterance may be provided, for example, through a microphone (not shown) or similarly functioning device accessible by the system.

In block 202, the system may further read additional text data for building the n-gram language model. The additional text data refers to text data which includes a plurality of sentences having at least one target keyword.

The additional text data may be prepared by a variety of methods known to a person having ordinary skill in the art.

One embodiment of present principles includes preparing the additional text data as follows. Sentences including at least one target keyword in search query can be obtained from, for example, the World Wide Web, by searching for the target keyword from texts on the Web. The sentences including at least one target keyword can be used as the additional text data.

Another embodiment of present principles includes preparing the additional text data as follows. Large speech data are obtained by operating the ASR system, while the ASR system is running. The large speech data includes a keyword, where the keyword may be a target keyword in a search query in automatic transcription data obtained by the ASR system for the spoken term detection. Transcribed data, including the target keyword, are obtained by manually re-transcribing a part of the speech data. The transcribed data may optionally include at least one word which was erroneously detected as the target keyword by the ASR system. The word which was erroneously detected as the target keyword by the ASR system is also called "a word which may be confused with a target keyword" or "a confusing word". The transcribed data including the target keyword, the word which was erroneously detected by the ASR system as the target keyword, or combination thereof can be used as the additional text data. Namely, the additional text data includes a plurality of sentences comprising at least one target keyword and, optionally, a sentence or plurality of sentences comprising at least one word which was erroneously detected as the target keyword by the ASR system.

The additional text data are useful to build the n-gram language model for the ASR. This is because if the training data comprises the additional text data in addition to the training text data, the training data will provide useful context information relating to the target keyword with the n-gram language model.

The system may read the additional text data from storage (291) accessible by the system. The storage (291) may include an internal storage (108) or external storage of the system or another storage accessible from the system via a network such as a network attached storage (NAS).

In block 202, the system may read the training text data and the additional text data simultaneously, in parallel, or at a different time.

In block 202, the system may read the training text data and the additional text data from the same storage or different storages.

In block 203, which may be an optional block, the system may combine the additional text data with the training text data to make training data for the n-gram language model. The system may store the training data in storage (291).

In block 204, the system builds the n-gram language model by a smoothing algorithm having discount parameters for n-gram counts. The building of the n-gram language model comprises the following blocks of (204-1) to (204-3). In block 204-1, building the n-gram language model includes counting the n-gram counts using the training data, or the training text data and the additional text data. In block 204-2, building the n-gram language model further includes discounting the n-gram counts by the smoothing algorithm. In block 204-3, building the n-gram language model further includes tuning each discount parameter for each target keyword using development data.

In block 204-1, the system counts the n-gram counts using the training data obtained from block 203 or the training text data and additional text data both obtained from block 202. This counting is performed by methods known to a person having ordinary skill in the art.

In block 204-2, the system discounts the n-gram counts to redistribute it for unobserved n-grams so that probabilities of the unobserved n-grams are not zero. The discount parameters, which adjust amounts of discount for n-grams counts, may be determined by a smoothing algorithm.

The smoothing algorithm used in one embodiment of the present invention is selected from the following list, but is not limited to: a Kneser-Ney Smoothing, a Modified Kneser-Ney Smoothing, an additive smoothing, a good-turing estimate, a Jelinek-Mercer Smoothing, a Katz Smoothing, a Witten-Bell Smoothing, an absolute discounting, a Church-Gale Smoothing, and a Bayesian Smoothing. These smoothing algorithms are known to the art, for example, by the following publications: Publication 1: Stanley F. Chen and Joshua Goodman, "An Empirical Study of Smoothing Techniques for Language Modeling", HARVARD University, TR-10-98, August 1998, available at http://www.speech.sri-.com/projects/srilm/manpages/pdfs/chen-goodman-tr-10-98.pdf, and Publication 2: Martin Christian Körner, "Implementation of Modified Kneser-Ney Smoothing on Top Generalized Language Models for Next Word Prediction", Bachelorarbeit, UNIVERSTÄT KOBLENZ LANDAU, September, 2013, available at https://west.uni-koblenz.de/sites/default/files/BachelorArbeit_MartinKoerner.pdf, the contents of these publications are incorporated by reference herein.

In the following explanations, the Kneser-Ney Smoothing or the Modified Kneser-Ney Smoothing is used as an example. It is readily contemplated that persons skilled in the art would use other smoothing algorithms as well as the Kneser-Ney Smoothing and the Modified Kneser-Ney Smoothing.

In Kneser-Ney Smoothing at higher levels from bigrams to second-highest n-grams of calculation, the following equation having the discount parameter, "D", may be used:

$$P_{KN}(w_i \mid w_{i-n+1}^{j-1}) = \frac{\max\{N_{1+}(\cdot w_{i-n+1}^{j}) - D, 0\}}{N_{1+}(\cdot w_{i-n+1}^{j-1} \cdot)} + \frac{D}{N_{1+}(\cdot w_{i-n+1}^{j-1} \cdot)} N_1 + (w_{i-n+1}^{j-1} \cdot) P_{KN}(w_i \mid w_{i-n+1}^{j-1})$$

where $$N_{1+}(\cdot w_{i-n+1}^{j}) = |\{w_{i-n} : c(w_{i-n}^{j}) > 0\}|$$

$$N_{1+}(\cdot w_{i-n+1}^{j-1} \cdot) = |\{(w_{i-n}, w_i) : c(w_{i-n}^{j}) > 0\}| = \sum_{w_i} N_{1+}(\cdot w_{i-n+1}^{j})$$

In addition, for the Kneser-Ney Smoothing at the highest level (highest n-grams), the following equation having the discount parameter, "D", may be used:

$$P_{KN}(w_i \mid w_{i-n+1}^{j-1}) = \frac{\max\{c(w_{i-n+1}^{j}) - D, 0\}}{c(w_{i-n+1}^{j-1})} + \frac{D}{c(w_{i-n+1}^{j-1})} N_1 + (w_{i-n+1}^{j-1} \cdot) P_{KN}(w_i \mid w_{i-n+1}^{j-1})$$

The discount parameter D may be calculated similar to the absolute discounting.

In one embodiment of the absolute discounting, the discount parameter D may be estimated based on the total number of n-grams occurring exactly once ($n_1$) and twice ($n_2$) by the following equation:

$$D = \frac{n_1}{n_1 + 2n_2}.$$

In another embodiment of the absolute discounting, the discount parameter D is calculated by optimizing the perplexity of held-out data.

In Kneser-Ney Smoothing, the weight $$\frac{D}{N_{1+}(\cdot w_{i-n+1}^{j-1} \cdot)} N_1 + (w_{i-n+1}^{j-1} \cdot)$$

may be used to determine the impact of the lower order value on the result. The weight $$\frac{D}{N_{1+}(\cdot w_{i-n+1}^{j-1} \cdot)} N_1 + (w_{i-n+1}^{j-1} \cdot)$$

corresponds to a parameter, "γ". The parameter, "γ", is a weight at the time of an interpolation.

The fraction represents the amount that was subtracted from the higher order result using the discount parameter D. Following the intuition of the absolute discounting, the lower order value is more relevant if the sequence, $w_{1-n+1}^{i-1}$, has a low count and a high number of different preceding words. Therefore, the weight is multiplied by $N_{1+}(w_{i-n+1}^{i-1}\bullet)$.

For Modified Kneser-Ney Smoothing at the higher levels from bigrams to second-highest n-grams of calculation, the following equation having the discount parameter D may be used:

$$P_{MKN}(w_i \mid w_{i-n+1}^{i-1}) =$$

$$\frac{\max\{N_{1+}(\cdot w_{i-n+1}^i) - D(c(w_{i-n+1}^i)), 0\}}{N_{1+}(\cdot w_{i-n+1}^{i-1} \cdot)} + \gamma low(w_{i-n+1}^{i-1}) P_{MKN}(w_1 \mid w_{i-n+2}^{i-1})$$

where $$D(c) = \begin{cases} 0 & \text{if } c = 0 \\ D_1 & \text{if } c = 1 \\ D_2 & \text{if } c = 2 \\ D_{3+} & \text{if } c > 2 \end{cases}.$$

One out of three different discounting parameters, "D", may be used in the Modified Kneser-Ney Smoothing instead of just one "D" defined in the equation of the Kneser-Ney Smoothing. This approach is based on studies showing that a sequence with a count of 1 or 2 requires a different discount value than sequences with a higher count.

The discounting parameters, "$D_1$", "$D_2$", and "$D_{3+}$", may be defined as follows:

$$D_1 = 1 - 2D\frac{n_2}{n_1}$$

$$D_2 = 2 - 3D\frac{n_3}{n_2}$$

$$D_{3+} = 3 - 4D\frac{n_4}{n_3}$$

with D similar to Equation $$D = \frac{n_1}{n_1 + 2n_2}$$

and $n_3$ and $n_4$ analogous to $n_1$ and $n_2$.

The parameter, "$\gamma$", is a weight at the time of an interpolation.

The scaling factor $\gamma low(w_{i-n+1}^{i-1})$ may be defined as follows:

$$\gamma low(w_{i-n+1}^{i-1}) = \frac{D_1 N_1(w_{i-n+1}^{i-1} \cdot) + D_2 N_2(w_{i-n+2}^{i-1} \cdot) + D_{3+} N_{3+}(w_{i-n+1}^{i-1} \cdot)}{N_{1+}(\cdot w_{i-n+1}^{i-1} \cdot)}$$

where $N_{1+}(w_{i-n+1}^{i-1} \cdot)$, $N_2(w_{i-n+1}^{i-1} \cdot)$, and $N_{3+}(w_{i-n+1}^{i-1} \cdot)$ are analogously defined to $N_{1+}(w_{i-n+1}^{i-1}\bullet)$:

$$N_1(w_{i-n+1}^{i-1}\bullet) = |\{w_i : c(w_{i-n+1}^i) = 1\}|$$

$$N_2(w_{i-n+1}^{i-1}\bullet) = |\{w_i : c(w_{i-n+1}^i) = 2\}|$$

$$N_{3+}(w_{i-n+1}^{i-1}\bullet) = |\{w_i : c(w_{i-n+1}^i) > 2\}|.$$

In addition, for Modified Kneser-Ney Smoothing at highest level (highest n-grams), the following equation having the discount parameter, "D", may be used:

$$P_{MKN}(w_i \mid w_{i-n+1}^{i-1}) =$$

$$\frac{\max\{c(w_{i-n+1}^i) - D(c(w_{i-n+1}^i)), 0\}}{c(\cdot w_{i-n+1}^{i-1})} + \gamma high(w_{i-n+1}^{i-1}) P_{MKN}(w_i \mid w_{i-n+2}^{i-1})$$

where $$\gamma high(w_{i-n+1}^{i-1}) = \frac{D_1 N_1(w_{i-n+1}^{i-1} \cdot) + D_2 N_2(w_{i-n+1}^{i-1} \cdot) + D_{3+} N_{3+}(w_{i-n+1}^{i-1} \cdot)}{c(w_{i-n+1}^{i-1})}.$$

The counts after the discount of the n-gram counts by the smoothing algorithm is also called "pseudo-count".

For the lowest level of the n-model in the Kneser-Ney Smoothing and the modified Kneser-Ney Smoothing, the discount is not performed. In one embodiment of the present invention, when the n-gram is unigram, the discount is not performed. In another embodiment of the present invention, for example, suppose that a zero-gram in which all unigrams appear in equal probability. The probability is calculated according to $(w_{i-n+1}^{i-1}\bullet) = \Phi$, and when n-gram is the zero-gram, the discount is not performed.

In block 204-3, the system tunes each discount parameter for each target keyword using development data so that a predetermined balance between precision and recall is achieved. The development data may include sentences having at least one target keyword, but is not used as the additional text data. The development data are obtained by a similar way of that for obtaining the additional text data. Namely, text data which are not used for the additional text data are used for the development data. The development data does not necessarily have a target keyword.

The system can vary the discount parameter for each keyword.

In one embodiment of the present invention, the system may tune each discount parameter of the smoothing algorithm so that the discount parameter for the target keyword is tuned to be larger to decrease erroneous detection of the target keyword, where erroneous detection occurred in a spoken term detection by using the development data.

In another embodiment of the present invention, the system may tune each discount parameter of the smoothing algorithm so that the discount parameter for the target keyword is tuned to be smaller to increase n-gram counts of each word which is not the target keyword and was erroneously detected as the target keyword by the ASR system.

In detail, the system may further discount the pseudo-count $C_w$ of n-gram comprising a target keyword W to $M_w C_w$ ($M_w < 1$). $M_w$ is determined in advance by using a search algorithm. $M_w$ may be set to, for example, "0.1".

In one embodiment of the search algorithm, $M_w$ can be set by Grid search using the development data. Grid search is used for searching for estimator parameters. For example, an additional discount parameter for adding the discounted amount may be set by the Grid search using the development data.

In another embodiment, $M_w$ can be set by the following algorithm comprising blocks 1 and 2:

Block 1: The spoken term detection is performed using the development data.

If an erroneous detection of the target keyword W occurred, the system adjusts $M_w$ for the target keyword W to be smaller to improve the precision for the target keyword W. The improvement of the precision results in the degradation of the recall. If $M_w$ for the target keyword W is adjusted smaller, the system may recognize the target keyword more precisely.

After the spoken term detection is performed by the development data, when a high rate of the recall for a specific word is required compared to a rate of the precision, the $M_w$ for the specific word may be adjusted to be larger. On the other hand, when a high rate of the precision for a specific word is required compared to a rate of the recall, the $M_w$ for the specific word may be adjusted to be smaller.

From these adjustments, each of the precision or recall will be improved according to the purpose of a customer. Further, the balance of the precision and recall will be freely adjusted according to the purpose of a customer.

Block 2: The system repeats block 1 until the predetermined balance between the precision and the recall is achieved.

In the equation of the Modified Kneser-Ney Smoothing, for example, the word sequences $(W_{i-n+1}^i)$ includes the term, "state", and a client request is to improve the recall for the term, "state". $M_w$, wherein w=state, can be set to 0.1, according to the algorithm described above.

The system will increase the value of the discount parameter D, if the term "state" is included in the word sequences $(W_{i-n+1}^i)$. In detail, the system increases the value of the discount parameter D such that value of $c(W_{i-n+1}^i)$ or $N_1+(\bullet W_{i-n+1}^i)$, and the Modified Kneser-Ney Smoothing becomes $M_w$ being 0.1 times of the original value of $c(W_{i-n+1}^i)$ or $N_1+(\bullet W_{i-n+1}^i)$, respectively.

The element, $c(W_{i-n+1}^i)$, in the Modified Kneser-Ney Smoothing means the number of times that word sequences, $w_{i-n+1}, w_{i-n+2}, \ldots, w_i$, appears in the training data.

The element, $N_1+(\bullet W_{i-n+1}^i)$, in the Modified Kneser-Ney Smoothing means the number of types of words which is present more than once in a position "*", when all of word sequences, *, $w_{i-n+1}, w_{i-n+2}, \ldots, w_i$, are taken from the training data.

For example, the word sequence "* is a state in the USA" is retrieved from the training data and the following seven sentences are obtained:

"Washington is a state in the USA.";
"Oregon is a state in the USA.";
"California is a state in the USA.";
"California is a state in the USA.";
"Oregon is a state in the USA.";
"Oregon is a state in the USA."; and
"Arizona is a state in the USA".

When the word sequences are seven sentences mentioned above, the number of types of words which is present more than once in a position "*" is as follows:

C "is a state in the USA" is 7, the total number of the sentences being 7.

N1+(* is a state in the USA) is 4, N1 being "Washington", "Oregon", "California" and "Arizona".

N1 (* is a state in the USA) is 2, N1 being "Washington" and "Arizona".

N2 (* is a state in the USA) is 1, N2 being "California".

N3 (* is a state in the USA) is 1, N3 being "Oregon".

After the discount parameter D is increased, the system recalculates the parameter "γ" in the smoothing algorithm by inputting the increased discount parameter into the smoothing algorithm, such as the Kneser-Ney Smoothing or the Modified Kneser-Ney Smoothing. The parameter, "γ", is a weight at the time of an interpolation.

After the parameter, "γ", is recalculated, the system may build the n-gram language model by the smoothing algorithm having recalculated values.

The system may store the n-gram language model in storage (292) accessible by the system. The storage (292) may include an internal storage (108) or external storage of the system or another storage accessible from the system via a network such as a network attached storage (NAS).

In block 205, the system ends the method.

The n-gram language model made by the method described in FIG. 2 may be used for the ASR to perform spoken term detection. Accordingly, the n-gram language model made by the method described in FIG. 2 may be delivered to the ASR system.

Figure 3:
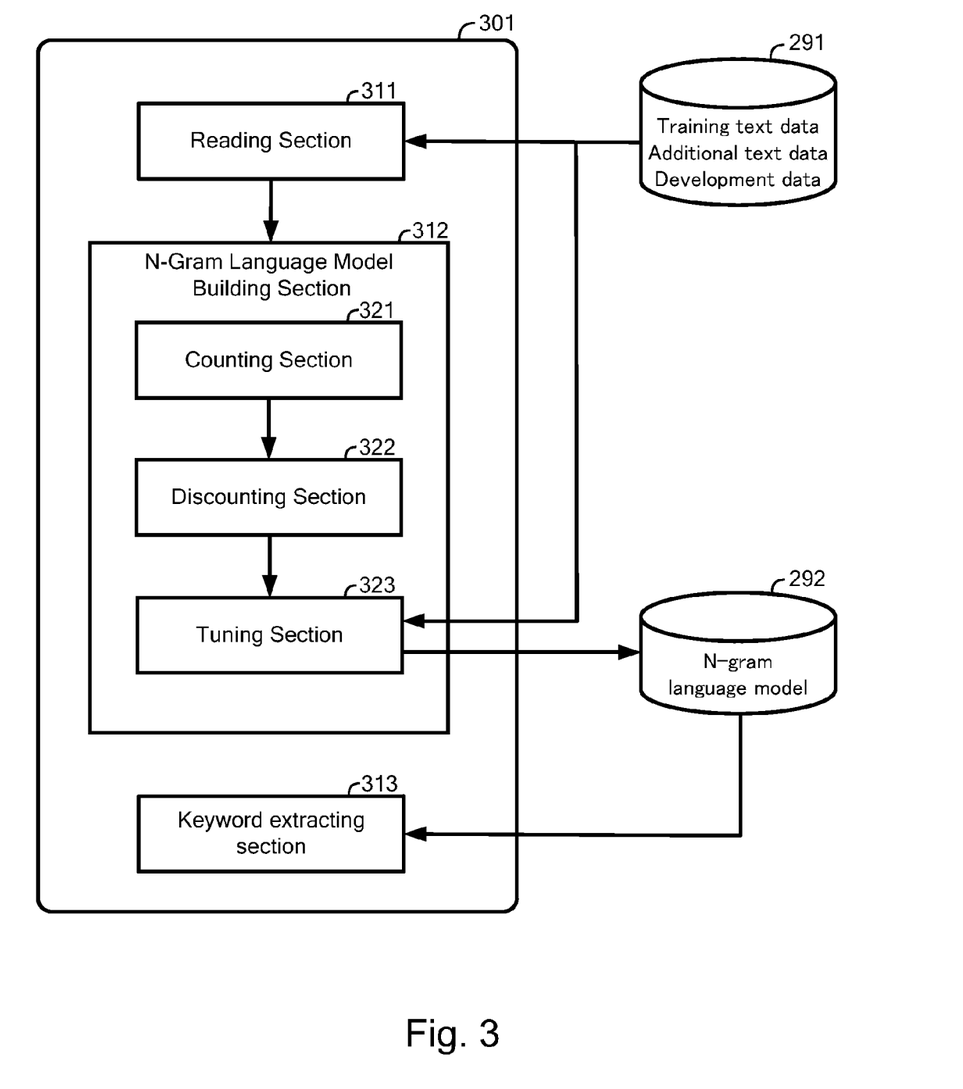
FIG. 3 illustrates one embodiment of an overall functional block diagram of a system hardware used in an embodiment of the present invention.

With reference now to FIG. 3, FIG. 3 illustrates one embodiment of an overall functional block diagram of a system hardware used in an embodiment of the present invention.

The system (301) corresponds to the computer (101) described in FIG. 1.

The system (301) includes a reading section (311) and an n-gram language model building section (312). Optionally, the system (301) may further include a keyword extracting section (313).

The reading section (311) reads training text data for building the n-gram language model. The reading section (311) further reads additional text data for building the n-gram language model.

The reading section (311) may perform block 202 and, optionally block 203, both described in FIG. 2.

The language model building section (312) may include a counting section (321), a discounting section (322) and a tuning section (323).

The counting section (321) counts the n-gram counts using the training data obtained by combining the additional text data with the training text data or the training text data and additional text data, both obtained from block the reading section (311).

The counting section (321) may perform block 204-1.

The discounting section (322) discounts the n-gram counts by a smoothing algorithm having discount parameters for n-gram counts.

The discounting section (322) may perform block 204-2.

The tuning section (323) tunes each discount parameter for each target keyword using development data so that a predetermined balance between precision and recall is achieved.

The tuning section (323) may perform block 204-3.

The keyword extraction section (313) may perform an automatic speech recognition using the n-gram language model obtained from the language model building section (312).

According to one embodiment of the present invention, the following experiment was performed.

The spoken term detection on a telephone conversation in a call center was performed. About 20 target keywords were selected by the customer. The customer's request is to improve the precision at high rate (accordingly, the recall is relatively low). The additional text data were prepared from automatic transcription data comprising 10 to 100 sentences for each keyword.

The n-gram language model was built according to the method described in FIG. 2. $M_w$ was determined by the Grid-search so that the precision has the highest value, using the development data.

Each precision value obtained from the method according to one embodiment of the present invention is higher than that value obtained from the conventional method. The average of the precision values obtained from the method according to one embodiment of the present invention is 0.17 higher than that of the precision values obtained from the conventional method.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

Having described preferred embodiments of a system and method for generating a synonym list from an existing thesaurus (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for building an n-gram language model for an automatic speech recognition, comprising:
reading training text data and additional text data for the n-gram language model from storage, wherein the additional text data comprises a plurality of sentences having at least one target keyword;
building the n-gram language model by a smoothing algorithm having discount parameters for n-gram counts, wherein each discount parameter for each target keyword is tuned using development data which are different from the additional text data so that a predetermined balance between precision and recall is achieved;
decreasing erroneous detection of one or more target keywords by tuning all of the discount parameters to be larger, or increasing n-gram counts of each of a plurality of words erroneously detected as one of the one or more target keywords by tuning each of the discount parameters to be smaller; and
performing spoken term detection based on the n-gram language model built using the development data.

2. The method according to claim 1, wherein building the n-gram language model comprises:
counting the n-gram counts using the training text data and the additional text data; and
discounting the n-gram counts by the smoothing algorithm.

3. The method according to claim 1, wherein the discount parameter for the target keyword is tuned to be larger to decrease erroneous detection of the target keyword, which erroneous detection occurred in a spoken term detection done by using the development data.

4. The method according to claim 1, wherein the additional text data further comprises at least one sentence having at least one word which was erroneously detected as the target keyword by the automatic speech recognition.

5. The method according to claim 4, wherein the discount parameter for the target keyword is tuned to be smaller to increase the n-gram counts of each word which was erroneously detected as the target keyword.

6. The method according to claim 1, wherein an additional discount parameter is set by a Grid search using the development data.

7. The method according to claim 1, wherein the smoothing algorithm is a Kneser-Ney smoothing or a modified Kneser-Ney smoothing.

8. A system for building an n-gram language model for an automatic speech recognition, comprising:
a processor; and
a memory configured to store a program, which, when executed on the processor, performs the method for building the n-gram language model for the automatic speech recognition, the method comprising:
reading training text data and additional text data both for the n-gram language model from a storage, wherein the additional text data comprise plural sentences having at least one target keyword;
building the n-gram language model by a smoothing algorithm having discount parameters for n-gram counts, wherein each discount parameter for each target keyword is tuned using development data which are different from the additional text data so that a predetermined balance between precision and recall is achieved;
decreasing erroneous detection of one or more target keywords by tuning all of the discount parameters to be larger, or increasing n-gram counts of each of a plurality of words erroneously detected as one of the one or more target keywords by tuning each of the discount parameters to be smaller; and
performing spoken term detection based on the n-gram language model built using the development data.

9. The system according to claim 8, the method further comprising:
counting the n-gram counts using the training text data and the additional text data; and
discounting the n-gram counts by the smoothing algorithm.

10. The system according to claim 8, wherein the discount parameter for the target keyword is tuned to be larger to decrease erroneous detection of the target keyword, which erroneous detection occurred in a spoken term detection done by using the development data.

11. The system according to claim 8, wherein the additional text data further comprises at least one sentence having at least one word which was erroneously detected as the target keyword by the automatic speech recognition.

12. The system according to claim 11, wherein the discount parameter for the target keyword is tuned to be smaller to increase n-gram counts of each word which was erroneously detected as the target keyword.

13. The system according to claim 8, wherein an additional discount parameter is set by a Grid search using the development data.

14. The system according to claim 8, wherein the smoothing algorithm is a Kneser-Ney smoothing or a modified Kneser-Ney smoothing.

15. The system according to claim 8, wherein the system further comprises a keyword extraction section configured to extract a keyword from a speech data by the automatic speech recognition applied to the n-gram language model in which the discount parameter was tuned.

16. A computer program product for building an n-gram language model for an automatic speech recognition, the computer program product comprising a non-transitory computer usable storage medium having program instructions embodied therewith, the program instructions executable by a computer to cause the computer to perform a method comprising:

reading training text data and additional text data both for the n-gram language model from a storage, wherein the additional text data comprise plural sentences having at least one target keyword;

building the n-gram language model by a smoothing algorithm having discount parameters for n-gram counts, wherein each discount parameter for each target keyword is tuned using development data which are different from the additional text data so that a predetermined balance between precision and recall is achieved;

decreasing erroneous detection of one or more target keywords by tuning all of the discount parameters to be larger, or increasing n-gram counts of each of a plurality of words erroneously detected as one of the one or more target keywords by tuning each of the discount parameters to be smaller; and performing spoken term detection based on the n-gram language model built using the development data.

17. The computer program product according to claim 16, wherein building the n-gram language model by the smoothing algorithm comprising:

counting the n-gram counts using the training text data and the additional text data; and discounting the n-gram counts by the smoothing algorithm.

18. The computer program product according to claim 16, wherein the discount parameter for the target keyword is tuned to be larger to decrease erroneous detection of the target keyword, which erroneous detection occurred in a spoken term done by using development data detection.

19. The computer program product according to claim 16, wherein the additional text data further comprises at least one sentence having at least one word which was erroneously detected as the target keyword by the automatic speech recognition.

20. The computer program product according to claim 19, wherein the discount parameter for the target keyword is tuned to be smaller to increase the n-gram counts of each word which was erroneously detected as the target keyword.

* * * * *